(12) United States Patent
Platt et al.

(10) Patent No.: US 7,119,894 B2
(45) Date of Patent: *Oct. 10, 2006

(54) LIGHT ADJUSTABLE ABERRATION CONJUGATOR

(75) Inventors: Ben C. Platt, Stevenson Ranch, CA (US); Christian A. Sandstedt, Pasadena, CA (US)

(73) Assignee: Calhoun Vision, Inc., Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/177,927

(22) Filed: Jul. 8, 2005

(65) Prior Publication Data

US 2006/0017990 A1    Jan. 26, 2006

(51) Int. Cl.
*G01B 9/00* (2006.01)
(52) U.S. Cl. ..................... 356/124

(58) Field of Classification Search ........... 356/124
See application file for complete search history.

(56) References Cited

U.S. PATENT DOCUMENTS

| | | | | |
|---|---|---|---|---|
| 4,575,373 A | * | 3/1986 | Johnson | 623/6.22 |
| 5,288,293 A | * | 2/1994 | O'Donnell, Jr. | 623/6.22 |
| 5,296,305 A | * | 3/1994 | Baude et al. | 428/520 |
| 6,413,276 B1 | * | 7/2002 | Werblin | 623/6.11 |
| 2002/0016629 A1 | * | 2/2002 | Sandstedt et al. | 623/6.11 |

* cited by examiner

*Primary Examiner*—Layla G. Lauchman
*Assistant Examiner*—Kara Geisel
(74) *Attorney, Agent, or Firm*—Fulbright & Jaworski LLP

(57) ABSTRACT

A method of correcting aberrations in an optical system by applying a light adjustable aberration conjugator layer to a component of the system, determining the nature of the aberration, applying radiation to the conjugator layer such as to change the refraction and/or shape of the conjugator layer to compensate for the aberration, and locking in the desired optical property.

19 Claims, 2 Drawing Sheets

LIGHT ADJUSTABLE ABERRATION CONJUGATOR

CROSS REFERENCE TO RELATED APPLICATIONS

This application claims priority to U.S. patent application No. 60/239,349, filed Oct. 11, 2000, U.S. patent application Ser. No. 09/977,857, filed Oct. 11, 2001, entitled, "LIGHT ADJUSTABLE ABERRATION CONJUGATOR," and U.S. patent application Ser. No. 10/784,656, filed Feb. 23, 2004, entitled, "LIGHT ADJUSTABLE ABERRATION CONJUGATOR," the disclosures of which are hereby incorporated herein by reference.

BACKGROUND OF THE INVENTION

1. Field of the Invention

This invention relates to methods of correcting for aberrations in an optical system, more specifically through the use and placement of media at appropriate positions in an optical system, the properties of the media being such that the refraction of the media can be modified by exposure of the media to light.

2. Background Information

Adaptive optical systems have been employed by astronomers, optical engineers, and vision scientists to compensate for wavefront aberrations generated by the atmosphere, telescope optics, optical design errors, and the inherent wavefront errors of the human visual system. In these systems, a wavefront sensor is used to measure the aberrations from the target to the imaging sensor. A computer is used to calculate the conjugate to the measured aberrations and deform a mirror with actuators to place the conjugate aberration on the deformable mirror's surface. The deformable mirror (DM) is usually placed at the image of the pupil to minimize isoplanatic errors in the optical system. When the DM is not placed at the pupil or an image of the pupil, the angular field of view, which the aberrations are corrected over, will not be as large.

To correct optical system aberrations, opticians will polish compensating surfaces on one of the elements. As an example, conjugate errors are often polished into the secondary mirror of a two-mirror telescope to compensate for errors in the primary mirror. This process can take hours in a production shop and days in a precision optical fabrication facility. As another example, the spherical aberrations present in typical camera systems are removed by polishing an aspheric surface onto one of the lens surfaces. Thus, fabricating an aberration conjugator as such is known and has been used in a number of applications.

In addition to adaptive optics and optical polishing, other approaches address the correction of aberrations in optical systems. These include ion polishing, the deposition of thin films, the use of binary optics, holographic elements, real time holography, and spatial light modulators.

All of these approaches have drawbacks. For example ion polishing and thin film deposition must be performed in a vacuum. Virtually all of these methods are costly and time consuming. Some are disadvantageous because of low efficiencies or because polarized light must be used. A less labor intensive, cost effective, and faster method of correcting aberrations in optical systems would provide significant advantages.

SUMMARY OF THE INVENTION

The present invention is a method of correcting aberrations in an optical system, and the correction structure that results from the method. More particularly, aberrations in an optical system are corrected by applying a light adjustable aberration conjugator layer to a component of the system, measuring the type and magnitude of the aberrations, applying radiation to the conjugator layer to change the refraction of the conjugator layer to compensate for the aberration, and locking in the desired optical property. The light adjustable media comprises a refraction modulating composition (RMC) dispersed in a polymer matrix. Optical and optical system aberrations arise from fabrication, alignment, and residual design errors. The aberration information in the optical system is measured to determine the exposure profile needed to convert a layer of the media placed in the appropriate part of the optical system into a form which will be the conjugate of the aberration and therefore null the aberration. Thus, the method of the invention, and the structure created thereby, will correct fixed aberrations in an optical system by putting the conjugate aberrations of the optical system on one of the surfaces in the optical system.

The foregoing has outlined rather broadly the features and technical advantages of the present invention in order that the detailed description of the invention that follows may be better understood. The foregoing and additional features and advantages of the invention that will be described hereinafter form the subject of the claims of the invention. It should be appreciated by those skilled in the art that the conception and specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying Figures. It is to be expressly understood, however, that each of the Figures is provided for the purpose of illustration and description only and is not intended as a definition of the limits of the present invention.

BRIEF DESCRIPTION OF THE DRAWINGS

The invention herein will be better understood by reference to the attached figures, in which.

DESCRIPTION OF REPRESENTATIVE EMBODIMENTS

The purpose of this invention is to more easily correct the fixed aberrations in an optical system by placing the conjugate of the optical system aberrations on one of the surfaces in the optical system. Fixed, optical system aberrations include aberrations from fabrication, alignment, and residual design errors. Correcting the fixed aberrations with light rather than by polishing or by the use of deformable mirrors saves time and money. The invention has advantages over ion polishing, surface layered optical coatings and deposited masks, which have to be performed in a vacuum and the surface being modified must be on an outer surface. The invention also has advantages over surface buildup with optical coatings and masks because they also have to be applied in a vacuum chamber and to an outer surface. The light adjustable material described herein can be applied to any surface in the optical train, as long as the optical system transmits enough of the light at the irradiation wavelength to cause polymerization of the dispersed refractive modulating composition (RMC). The method of the invention need not be performed in a vacuum.

The media used in the invention to correct optical system aberrations is a light sensitive material. In particular, the material comprises a first polymer matrix and a refraction modulating composition (RMC) dispersed therein, which will be described in greater detail hereinafter. When it is exposed as described herein, in the appropriate manner, the refraction of the material changes to compensate for aberrations in the optical system. It is referred to herein as a light adjustable aberration conjugator. The starting material can be applied, in a preferred embodiment, in a thin layer, approximately 1 mm thick, to almost any surface in the optical system, preferably to one of the smaller surfaces.

Figure 1:
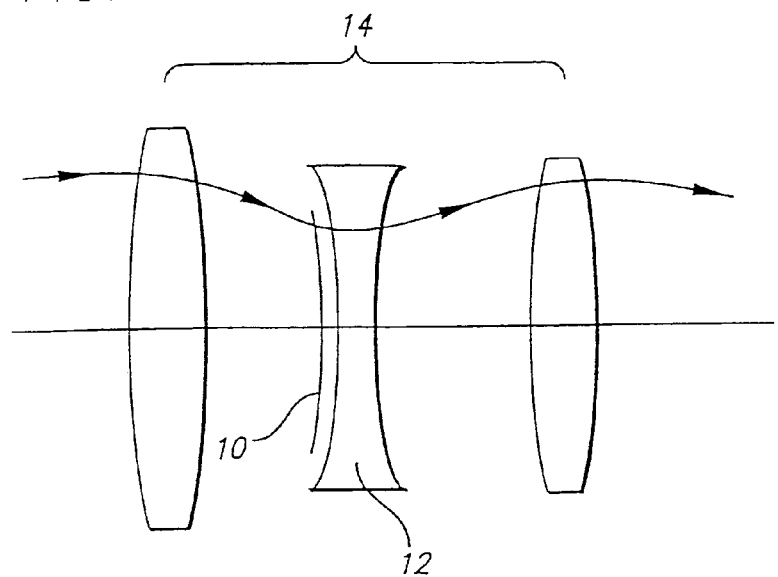
FIG. 1 shows a light adjustable aberration conjugator layer applied to the surface of a center negative element in a double Gauss lens.

FIG. 1 shows a light adjustable aberration conjugator layer 10 applied to an interior lens surface, specifically, to the surface of center negative element 12 in a double Gauss lens 14.

Figure 2A:
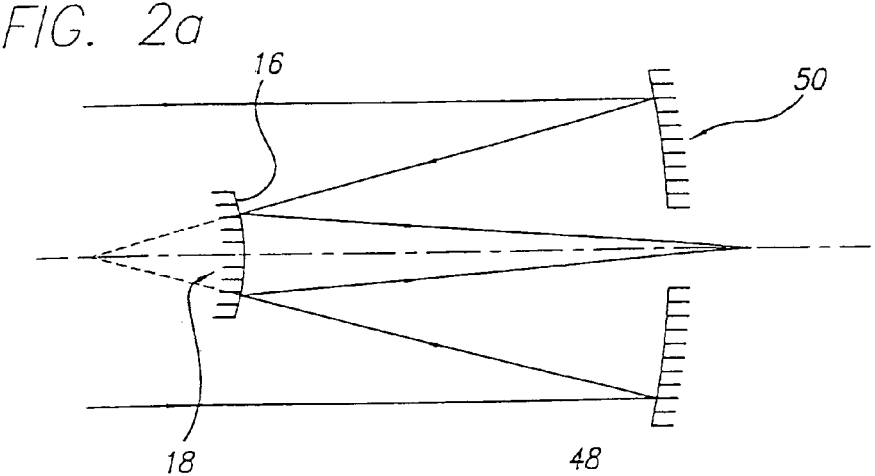
FIG. 2a shows a light adjustable aberration conjugator layer applied to the secondary mirror of a telescope, for reflection from the layer.
Figure 2B:
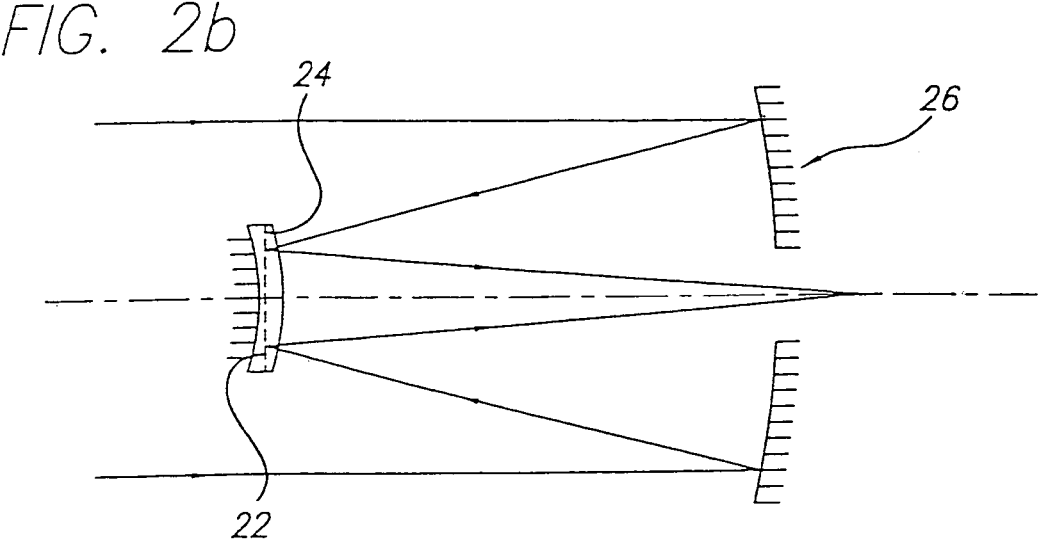
FIG. 2b shows a light adjustable aberration conjugator layer applied to the secondary mirror of a telescope, for transmission through the layer for reflection from the mirror.

FIG. 2a shows a light adjustable aberration conjugator layer 16 applied to the secondary mirror 18 of a telescope 20 for reflection from the layer 16. In this case the layer is coated with a reflective coating after irradiating with the profiling beam and the locking beam. FIG. 2b shows a light adjustable aberration conjugator-transmitting layer 22 placed over a mirror surface 24 of a telescope 26 and used in a double pass. This is referred to as a catadioptric design and corrects for fabrication errors but not for alignment errors after re-installing the secondary mirror.

Figure 3A:
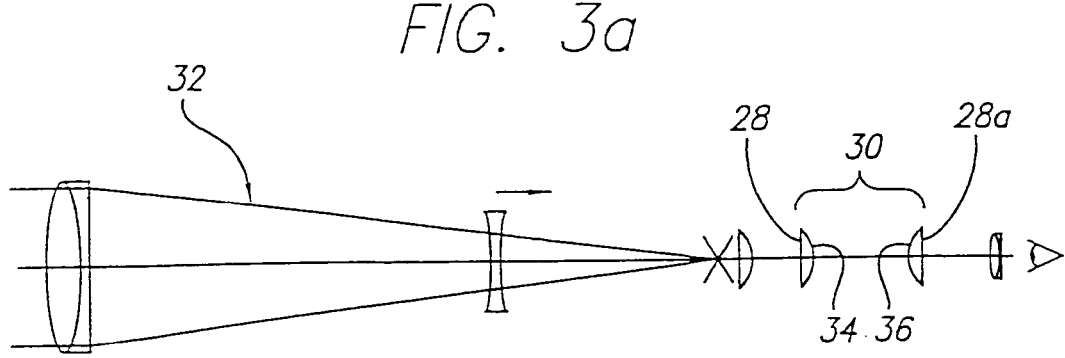
FIG. 3a shows a light adjustable aberration conjugator layer applied to either the forward or rearward surface of a window at the exit pupil of a telescope having a particular construction.
Figure 3B:
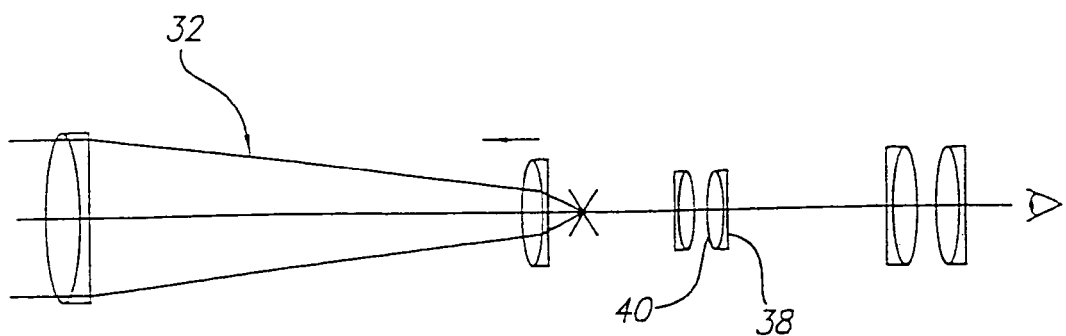
FIG. 3b shows a light adjustable aberration conjugator layer applied to either the rearward surface of a window at the exit pupil of a telescope of another construction.

FIG. 3a shows a light adjustable aberration conjugator layer 28 or 28a applied to a window 30 at the exit pupil of a telescope 32 of a particular construction, on either the front surface of the forward lens 34 or the rear surface of the rearward lens 36. FIG. 3b shows a light adjustable aberration conjugator layer 38 applied to the rear surface of the rearward lens 40 at the exit pupil of a telescope 42 of another construction. The telescopes can have a small refractive design or a larger reflective design. Since the aberration conjugator layer is on the outside of the optical system, at a pupil plane, and on a non-power element, it is the easiest to implement and can be added at any time after the optical system is fabricated. The advantages are much greater if the telescope is a large two-mirror reflective telescope. All optical systems will have some amount of fabrication errors. The tolerance on these errors will depend on its application and the cost will depend on the tolerances specified by the user.

Figure 4:
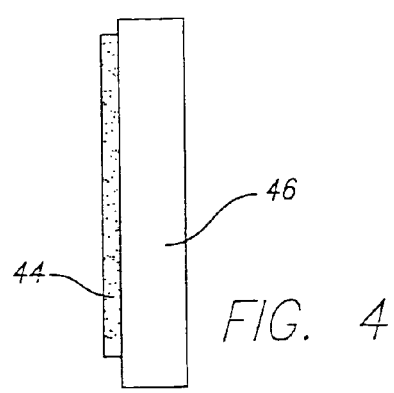
FIG. 4 shows an exposed light adjustable aberration conjugator layer on a flat substrate.
Figure 5:
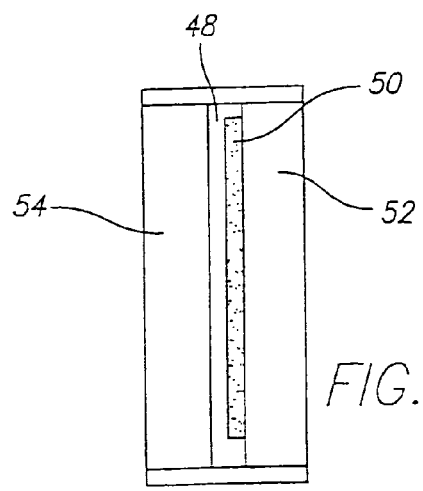
FIG. 5 shows a light adjustable aberration conjugator layer that is protected between two planes, window type substrates.

The light adjustable aberration conjugator layer 44 can be placed on a flat substrate 46 and be exposed as shown in FIG. 4 (or as shown in FIG. 3), or it can be protected by another lens in the system (as shown with a curved surface in FIG. 1. Another technique is to place the light adjustable aberration conjugator layer between two optical substrates. A void 48 between the light adjustable aberration conjugator layer 50, shown in FIG. 5, and opposing protecting windows 52 and 54 (which could, alternatively, be lenses) can be a vacuum or it can be filled with a gas, liquid or solid. An example of a suitable solid is another polymer that is polymerized after pouring over the light adjustable aberration conjugator. It would have to have a different refractive index to be effective, unless the refractive index modulation alone provides sufficient aberration correction. There are several advantages of using a liquid or solid over the light adjustable aberration conjugator layer, i.e., the light adjustable aberration conjugator layer is better protected and the layer does not have to be as precise. The disadvantage is that the dynamic range of correction will be less.

One embodiment of this invention is to use a wavefront sensor such as an interferometer or Shack-Hartmann sensor to measure the optical system aberrations and input them into a computer program that contains a light adjustable aberration conjugator nomogram. The computer calculates the required irradiation pattern. An irradiation system, operating at the appropriate wavelength irradiates the light adjustable aberration conjugator material with the calculated pattern. A special setup may be required if the light adjustable aberration conjugator layer is placed on the internal surface of the lens system. A more detailed description of the use of a Shack-Hartmann sensor, and a description of sources for radiation that can be used to expose/irradiate the material to form the light adjustable aberration conjugator, are given hereinafter under the heading "Exposing a Light Adjustable Aberration Conjugator Layer"

The complete process can be automated for production lines of lenses or mirror telescopes. The process can also be provided as a service if the customer sent in the measured aberrations and the pupil size or size of the light adjustable aberration conjugator surface. It can also be a post production process if the light adjustable aberration conjugator was placed on an exterior surface or an accessible surface. The invention can improve the optical performance of many different types of optical systems at an affordable cost and schedule. Once the aberrations are obtained and the setup is complete, the calculations and irradiation time should take less than 2 minutes and the diffusion time should take between 3 to 24 hours. This process reduces the labor, money, and time intensive processes of optical polishing, ion polishing, and thin film deposition. This invention will allow manufactures to correct camera lenses on the assembly line, researchers to correct optics on an optical bench, astronomers to correct fixed errors on large telescopes, and allow manufactures to design less expensive lens systems by incorporating low cost corrector plates.

In a specific embodiment of the invention, the optical element that becomes the light adjustable aberration conjugator comprises a first polymer matrix and a refraction modulating composition (RMC) dispersed therein. Such a composition is described in detail in International Application Serial No. PCT/US99/41650, filed on Oct. 13, 1999 and published Jul. 20, 2000, the disclosure of which is incorporated herein by this reference. As disclosed in that application, the first polymer matrix forms the optical element framework and is generally responsible for many of its material and optical properties. The RMC may be a single compound or a combination of compounds that is capable of stimulus-induced polymerization, preferably photo-polymerization. As used herein, the term "polymerization" refers to a reaction wherein at least one of the components of the RMC reacts to form at least one covalent or physical bond with either a like component or with a different component. The identities of the first polymer matrix and the RMCs will depend on the end use of the optical element. However, as a general rule, the first polymer matrix and the RMC are selected such that the components that comprise the RMC are capable of diffusion within the first polymer matrix. Put another way, a loose first polymer matrix will tend to be paired with larger RMC components and a tight first polymer matrix will tend to be paired with smaller refraction modulating composition components.

Upon exposure to an appropriate energy source (e.g., heat or light), the RMC typically forms a second polymer matrix in the exposed region of the optical element. Light sources that may be used are also described in International Application Serial No. PCT/US99/41650. The presence of the second polymer matrix changes the material characteristics of this portion of the optical element to modulate its refraction capabilities. In general, the formation of the second polymer matrix typically changes the radius of curvature (i.e. the exposed area swells), increases the refractive index, or both, of the affected portion of the optical element.

After exposure, the RMC in the unexposed region will migrate into the exposed region over time. The amount of RMC migration into the exposed region is dependent upon the intensity, wavelength, spatial profile, and duration of the applied light as well as the physical and chemical properties of the polymer composition. All of these factors may be precisely controlled to achieve the desired result. If enough time is permitted, the RMC components will re-equilibrate and redistribute throughout the optical element (i.e., the first polymer matrix, including the exposed region). When the region is re-exposed to the energy source, the RMC that has since migrated into the region (which may be less than if the refraction modulating composition were allowed to re-equilibrate) polymerizes to further increase the formation of the second polymer matrix. This process (exposure followed by an appropriate time interval to allow for diffusion) may be repeated until the exposed region of the optical element has developed the desired optical properties. At this point, the entire optical element is exposed to the energy source to "lock-in" the desired optical properties by evenly polymerizing the remaining RMC components in the optical element. Evenly polymerizing any remaining RMC components will remove the driving force for diffusion (i.e. prevent any further change in refraction) and prohibit any change in the optical properties of the aberration conjugation layer by subsequent exposure of the optical element to an appropriate energy source.

The first polymer matrix is a covalently or physically linked structure that functions as structure matrix for the aberration conjugator material and is formed from a first pre-polymer matrix composition. In general, the first polymer matrix composition comprises one or more monomers that upon polymerization will form the first polymer matrix. The first polymer matrix composition optionally may include any number of formulation auxiliaries that modulate and improve any property of the optical element. Illustrative examples of suitable first pre-polymer matrix composition monomers include acrylics, methacrylates, phosphazenes, siloxanes, vinyls, homopolymers and copolymers thereof. As used herein, a "monomer" refers to any unit (which may itself either be a homopolymer or copolymer), which may be linked together to form a polymer containing repeating units of the same. If the first pre-polymer matrix composition monomer is a copolymer, it may be comprised of the same type of monomers (e.g., two different siloxanes) or it may be comprised of different types of monomers (e.g., a siloxane and an acrylic).

In one embodiment, the one or more monomers that form the first polymer matrix are polymerized and cross-linked in the presence of the RMC. In another embodiment, polymeric starting material that forms the first polymer matrix is cross-linked in the presence of the RMC. Under either scenario, the RMC components must be compatible with and not appreciably interfere with the formation of the first polymer matrix. Similarly, the formation of the second polymer matrix should also be compatible with the existing first polymer matrix. Put another way, the first polymer matrix and the second polymer matrix should not phase separate and light transmission by the optical element should be unaffected.

As described previously, the RMC may be a single component or multiple components so long as: (i) it is compatible with the formation of the first polymer matrix; (ii) it remains capable of stimulus-induced polymerization after the formation of the first polymer matrix; and (iii) it is freely diffusable within the first polymer matrix. In one embodiment, the stimulus-induced polymerization is photo-induced polymerization.

Illustrative examples of a suitable first polymer matrix include: poly-acrylates such as poly-alkyl acrylates and poly-hydroxyalkyl acrylates; poly-methacrylates such as poly-methyl methacrylate ("PMMA"), poly-hydroxyethyl methacrylate ("PHEMA"), and poly-hydroxypropyl methacrylate ("HPMA"); poly-vinyls such as poly-styrene and poly-vinylpyrrolidone ("PNVP"); poly-siloxanes such as poly-dimethylsiloxane; poly-phosphazenes, and copolymers of thereof. U.S. Pat. No. 4,260,725 and patents and references cited therein (which are all incorporated herein by reference) provide more specific examples of suitable polymers that may be used to form the first polymer matrix.

In preferred embodiments, the first polymer matrix generally possesses a relatively low glass transition temperature (Tg) such that the resulting optical element tends to exhibit fluid-like and/or elastomeric behavior, and is typically formed by crosslinking one or more polymeric starting materials wherein each polymeric starting material includes at least one crosslinkable group. Illustrative examples of suitable crosslinkable groups include but are not limited to hydride, acetoxy, alkoxy, amino, anhydride, aryloxy, carboxy, enoxy, epoxy, halide, isocyano, olefinic, and oxime. In more preferred embodiments, each polymeric starting material includes terminal monomers (also referred to as end-caps) that are either the same or different from the one or more monomers that comprise the polymeric starting materials but include at least one crosslinkable group. In other words, the terminal monomers begin and end the polymeric starting material and include at least one crosslinkable group as part of its structure. Although it is not necessary for the practice of the present invention, the mechanism for crosslinking the polymeric starting material preferably is different than the mechanism for the stimulus-induced polymerization of the components that comprise the RMC. For example, if the RMC is polymerized by photo-induced polymerization, then it is preferred that the polymeric starting materials have crosslinkable groups that are polymerized by any mechanism other than photo-induced polymerization.

In some embodiments there may be used a class of polymeric starting materials for the formation of the first polymer matrix comprising poly-siloxanes (also known as "silicones") endcapped with a terminal monomer which includes a crosslinkable group selected from the group consisting of acetoxy, amino, alkoxy, halide, hydroxy, and mercapto. An example of one such material is bis(diacetoxymethylsilyl)-polydimethylsiloxane (which is polydimethylsiloxane that is endcapped with a diacetoxymethylsilyl terminal monomer).

The RMC is capable of stimulus-induced polymerization, preferably photo-induced polymerization and may be a single component or multiple components so long as: (i) it is compatible with the formation of the first polymer matrix; (ii) it remains capable of stimulus-induced polymerization after the formation of the first polymer matrix; and (iii) it is freely diffusable within the first polymer matrix. In general, the same type of monomers that are used to form the first polymer matrix may be used as a component of the RMC. However, because of the requirement that the RMC must be diffusable within the first polymer matrix, the RMC generally tend to be smaller (i.e., have lower molecular weights) than the monomers which form the first polymer matrix. In addition, the RMC may include other components such as initiators and sensitizers that facilitate the formation of the second polymer matrix.

In preferred embodiments, the stimulus-induced polymerization is photo-polymerization. In other words, the RMC preferably includes at least one group that is capable of photopolymerization. Illustrative examples of such photopolymerizable groups include but are not limited to acrylate, allyloxy, cinnamoyl, methacrylate, stibenyl, and vinyl. In more preferred embodiments, the RMC includes a photoinitiator (any compound used to generate free radicals) either alone or in the presence of a sensitizer. Examples of suitable photoinitiators include acetophenones (e.g., a-substituted haloacetophenones, and diethoxyacetophenone); 2,4-dichloromethyl-1,3,5-triazines; benzoin methyl ether; and o-benzoyl oximino ketone. Examples of suitable sensitizers include p-(dialkylamino)aryl aldehyde; N-alkylindolylidene; and bis[p-(dialkylamino)benzylidene] ketone.

In some cases it may be useful to expose the media to light in a series of steps, whereby after the first exposure, one would wait an interval of time and then re-expose the same portion of the media to the stimulus. This procedure generally will induce the further polymerization of the RMC within the exposed portion. These steps can be repeated any number of times until the media has reached the desired characteristic properties. At this point, the method may further include the step of exposing the entire layer to the stimulus to lock-in the desired property.

In one form, then, the invention includes or consists of a series of steps: in an optical system, determining aberrations to be corrected; applying radiation (such as UV, IR or visible light) sensitive media across or upon one or more optical elements in the system; and, exposing at least a portion of such media to the radiation so as to create an aberration conjugate.

Exposing a Light Adjustable Aberration Conjugator Layer

Details of the use of irradiation sources and methods of patterning the exposure of a light adjustable aberration layer, such as the conjugate layer used in this invention, are found in an application filed in the United States Patent and Trademark office on Sep. 26, 2001, Ser. No. 09/964,786, entitled "Delivery System for Post-Operative Power Adjustment of Adjustable Lens" by Ben C. Platt, Christian A. Sandstedt, and James A. Ebel, the disclosure of which is incorporated herein by this reference. An irradiation system can consist of several major parts, 1) irradiation source, 2) diagnostic system 3) Irradiation Intensity system, and 4) locking system. Each will be described in more detail below.

Irradiation Source

The irradiation source must be compatible with the photosensitivity of the material being irradiated. In a particular example, the RMC system is sensitive to UV radiation between the wavelengths of 325 nm and 380 nm so the irradiation source is a UV source. The UV source can be a laser, light emitting diode, or various types of lamps that possess a UV spectrum. The source can also be continuous (CW) or pulsed. For example, the source can be a CW mercury arc lamp fitted with an interference filter to produce a beam centered at 365 nm+/−10 nm (full width at full maximum. A helium cadmium (HeCd) laser operating at 325 nm and a mercury (Hg) arc lamp spectrally filtered for the emission lines at 334 and 365 nm can be used. These UV sources, including the tripled frequency laser diode pumped solid state YAG laser operating at 355 nm, an argon ion laser operating in the 350–360 nm range, a deuterium discharge lamp, and broad band xenon:mercury lamps operating with any narrow band spectral filter are useful sources for providing UV irradiation. A UV LED can also be a suitable energy source. For example, one can use a UV LED available on the market that has an optical output power of 0.75 to 1 mW centered at 370 nm with a full width half max spectral bandwidth of +/−10 nm.

Diagnostic System

A diagnostic system is used to measure the aberrations in the optical system before, during, and/or after irradiation. There are many instruments available to measure such aberrations. Five common wavefront sensors used today are based on the Schemer disk, the Shack Hartmann wavefront sensor, the Hartmann screen, and the Fizeau and Twymann-Green interferometers. In a particular implementation: a) a Shack Hartmann wavefront sensor is used to measure the aberrations in the optical system; b) a nomogram of the light adjustable conjugator layer's response to irradiation is then consulted to determine the required intensity profile to correct the measured aberrations; c) the required intensity profile is placed on a static mask (e.g. an apodizing filter) or a programmable mask generator (such as a digital mirror device); d) a calibration camera is used in a closed loop operation to correct the digital mirror device to compensate for aberrations in the projection optics and non-uniformity in the light source; e) the light adjustable aberration conjugator layer is irradiated for the prescribed duration using the appropriate wavelength, intensity, and spatial profile; and f) after a specified diffusion time, the aberrations in the optical system are re-measured to ensure that the proper correction was made. If necessary, the process is repeated until the correction is within acceptable limits.

Irradiation Intensity System

Depending upon the light adjustable conjugator layer formulation, exposure to the appropriate frequency of light will cause the RMC to diffuse into the irradiated volume producing a concomitant change in the refraction of the light adjustable aberration conjugator layer. The majority of the change in refraction of the conjugator layer is due to swelling or shrinkage in the affected region. Although, it is possible that some localized change in refractive index could occur as well since the refractive index of a closed thermodynamic system such as the conjugator layer is proportional to the number of particles per volume. The photo reactive macromer in the irradiated region will polymerize producing a difference in chemical potential between the irradiated and unirradiated regions of the material. To reestablish thermodynamic equilibrium, the RMC in the unexposed region will diffuse towards irradiated regions producing localized swelling and a change in refractive power.

A spatial light modulator (SLM) can be used to generate a customized irradiation intensity profile for a composition comprising a RMC dispersed in a polymer matrix forming the light adjustable aberration conjugator layer. The SLM can be any suitable ones known to one skilled in the art. For example, it can be a liquid crystal display (LCD) or a digital light processor (DLP). Electromagnetic radiation in the UV, visible, or near infrared portions of the spectrum is easily projected using a projection system similar to the ones used in commercial video/computer projection systems. Nevertheless, these projectors use the LCD or DLP to replace the film used in the projectors. LCDs can operate in either transmission or reflection mode. Since they rotate the plane of polarization of the light, polarized light and an analyzer must be incorporated into the optical system.

DLPs are composed of an array of tiny square mirrors typically 17 microns on a side. Rather than modulate the intensity of the beam, they modulate the time the beam is on the screen. The tiny mirrors tilt +/−10 degrees at a rate of 60 kHz. If the mirror is activated to the on position, the light striking the mirror is reflected into the projection lens. If the mirror is in the off position, the light reflects to a beam dump and does not make it to the screen. For each of the 60 kHz frames, each mirror is either ON or OFF. Thus, the mirror activation is binary. For uniform illumination on the DLP, the energy density profile applied to the conjugator layer is proportional to the number of times each mirror is activated and not to the intensity of the beam.

The method of using constant incident intensity and spatially varying the exposure time has several advantages: a) it avoids trying to produce exposure levels below the intensity threshold level (the minimum irradiation level to produce a refractive change of the aberration conjugator layer), b) it avoids having to compensate for the material efficiency versus intensity level, and c) it makes the nomograms (a plot detailing the response of a light adjustable aberration conjugator layer to light intensity, profile, and duration) much easier to develop.

Alternatively, static apodizing filters can be used in a conventional film projection type of system to project an irradiation pattern onto the conjugator layer. As an example, UV light can be projected through an apodizing mask possessing a $$1 - \frac{r^2}{r_{max}^2}$$

transmission profile. Such an intensity profile enables the light adjustable aberration conjugator layer to produce desirable optical refractive changes in the underlying lens. Other transmission intensity profiles that are useful for irradiating the aberration conjugator layer include, but are not limited to, $$I = I_0 \left( a \frac{r^2}{r_{max}^2} + b \right)$$

where the coefficients a and b can range from 0 to 1, $$I = I_0 \left( 1 - \frac{2r^2}{r_{max}^2} + \frac{r^4}{r_{max}^4} \right),$$

$$I = I_0 \left( 1 - \frac{3r^2}{r_{max}^2} + \frac{3r^4}{r_{max}^4} - \frac{r^6}{r_{max}^6} \right),$$

Gaussian, inverse Gaussian, or a flat top profiles where r in each case represents the radius of the projected pattern. Each different intensity profile needs a new, individual mask to be placed in the projection system.

By using a LCD or a DLP to generate customized irradiation intensity profiles, the time and expense of making a static, customized mask can be eliminated. Each customized irradiation intensity profile can be generated on a computer screen and then transferred to the LCD or DLP projector. The variable pattern on the computer screen can be produced with an equation representing a 3-D image of the intensity pattern. The parameters of the equation can be varied using a nomogram obtained from use of a wavefront analysis system to calculate the shape of the desired irradiation intensity profile.

In another embodiment, a DLP is used for the purpose of generating an irradiation profile/mask for UV irradiation of the light adjustable aberration conjugator layer. A commercial DLP projector (such as sold by Infocus, Inc.), can be purchased, the optics and light source can be removed, and replaced with a UV light source and lens system. The optics and light source can be replaced to irradiate the conjugator layer. Script can be generated using commercial or personally developed mathematical and graphics software programs to view 3-D intensity profiles and 2-D intensity projections of those profiles. The computer can then be connected to the modified commercial projector and conjugator layers can be irradiated with various patterns, intensity levels, and exposure times to generate one or more irradiation nomograms. Typical intensity levels range from 2 to 10 mW/cm2 and typical exposure times range from 10 to 60 seconds.

Irradiation Profiling System

The nature of the irradiation profiling system will depend on the type of radiation used, such as, e-beam, microwave, radio frequency, acoustic, or optical. Optical lenses and apodizing filters can be used with an arc lamp. A customized pattern of irradiation generates a customized refraction change in the light adjustable aberration conjugator layer. The apodized pattern can be generated using several methods and take different forms. For example, the desired transmission pattern could be a static mask pattern imaged onto photographic film, photochemically etched onto a substrate using a pattern generating machine, or chrome applied to the appropriate substrate using chemical vapor deposition (CVD). This type of static pattern can possess either continuous or half tone structure. In addition, the desired pattern could be dynamic such as that produced by an appropriate spatial light modulator (SLM; e.g. a liquid crystal display (LCD) or a digital mirror device (DMD)), rotating or translating patterns, or any other method to vary the intensity profile or integration time of the exposed radiation dynamically. Some lasers are naturally apodized and may not require further intensity modulation for correcting aberrations. A photographic film mask can be placed between two glass slides to produce a 3-D intensity profile in a UV projection system similar to a conventional slide projector. The main components are a UV light source, condenser optics, a field lens, an apodizing filter, and projection optics.

Another potential source for producing a spatially defined, variable intensity pattern is a UV vertical cavity surface-emitting laser (VCSEL). In a VCSEL, light propagates vertically rather than laterally through the structure. With this orientation the laser cavity can be grown to match the wavelength of laser light. With such a small cavity, the gain bandwidth of the device can only support a single longitudinal mode. In contrast to the use of static mask or dynamic light modulator (e.g. LCD or DMD) a VCSEL array would only require a laser array, lens matrix array, and projection optics. Thus, the advantages are lower cost and complexity. A controlled VCSEL 2-D array of lasers replaces a mask or SLM, and the light source with its associated condenser optics to irradiate a light adjustable aberration conjugator layer. VCSELs can be single element lasers, 1-D arrays, or 2-d arrays. Each laser element emits a nearly square laser beam from the top surface in a narrow cone of light. Most of the research on these devices has been in the near IR for telecommunication applications. Some visible arrays have been developed for scanning and detecting images. The fill factor for 2-d arrays is usually small because of the space needed for the leads. Lens arrays can be placed on top of the VCSEL arrays to obtain fill factors greater than 90%. These lasers have very high modulation frequencies. If it is too difficult to control the intensity of the lasers, the energy in the exposure can be controlled with pulse width modulation or other modulation methods. By spatially controlling the intensity or average energy in each laser, one can produce an effective beam intensity profile. This pattern/profile is then imaged onto the light adjustable aberration conjugator layer to produce the desired refraction pattern. The advantage is direct and instantaneous or nearly instantaneous control of the irradiation pattern and increased pattern combinations. UV-VCSEL arrays are described in Photomiss Spectra, March 2001, p. 30, incorporated herein by reference. Since the same beam profile variation can be accomplished with various types of spatial light modulators and standard display or projection optics, advantages in the use of UV-VCSELs are in the simplicity and size of the packaging issues, which can be important when the irradiation system is combined with the wavefront sensor and some type of viewing and video capability.

Locking System

Once the aberrations are corrected, locking irradiation is applied. An example of locking irradiation is a "top hat" intensity profile. The obvious feature of this type of profile is that an even amount of intensity is applied to the conjugator layer. A further example of a photolocking intensity (I) profile may be one corresponding to the equation $$I = I_0 \left(1 - \frac{r^2}{r_{\max}^2}\right)$$

where $I_0$ is the peak intensity of the beam, r is the radius across the conjugator layer, and $r_{max}$ is radius of the image beam on the conjugator layer. Such a profile is useful for cases when a UV or other wavelength range absorbing additive is placed in the light adjustable aberration conjugator layer. If the conjugator layer possesses a variable thickness across its diameter, and contains a light blocking species with a strong absorption band at the wavelength(s) used for photolocking the aberration conjugator layer, locking irradiation can be prevented by from reaching the back of the layer. Such a situation would cause RMC to diffuse from the back of the light adjustable conjugator layer towards the front of the light adjustable conjugator layer. This action has the affect of flattening the back surface effectively changing the power of the conjugator layer. By placing a $$I = I_0 \left(1 - \frac{r^2}{r_{\max}^2}\right)$$

profile down onto the light adjustable aberration conjugator layer surface with sufficient intensity to completely penetrate the central thickest part of the conjugator layer as well as the thinner edges, photolocking is possible.

In General

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and/or steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for correcting at least one aberration in an optical system, comprising:
   providing a radiation adjustable layer to a component of the system;
   determining the at least one aberration; and
   applying radiation to the radiation adjustable layer such as to modify an optical characteristic of the radiation adjustable layer to at least partially compensate for the at least one aberration, wherein the applying comprises applying the radiation in a pattern based on the determining the at least one aberration;
   wherein the adjustable layer comprises a radiation sensitive refraction modulating composition.

2. The method of claim 1 wherein the component is a refractive element.

3. The method of claim 1 wherein the component is a reflective element.

4. The method of claim 1 wherein the optical system is selected from the group consisting of:
a telescope, and a camera.

5. The method of claim 1 wherein the pattern is opposite in phase to the determined aberration.

6. The method of claim 1 wherein the applying comprises:
generating the radiation with a vertical-cavity surface-emitting laser array.

7. The method of claim 1 wherein the applying comprises:
using an apodizing filter having a predetermined transmission intensity profile to form the pattern.

8. The method of claim 1 wherein the applying comprises:
using a liquid crystal cell to form the pattern.

9. The method of claim 1 wherein the applying comprises:
using a spatial light modulator to form the pattern.

10. The method of claim 1 wherein the applying comprises:
using a digital light processor to form the pattern.

11. The method of claim 1 wherein the applying comprises:
using a digital mirror device to form the pattern.

12. The method of claim 1 wherein the pattern has an intensity profile that changes as the radius of the pattern increases from the center of the pattern.

13. The method of claim 1 wherein the applying comprises:
controlling the radiation during the applying.

14. The method of claim 13 wherein the controlling comprises:
controlling at least one of intensity and duration of the radiation.

15. The method of claim 1 wherein the radiation is ultraviolet light.

16. The method of claim 1 wherein the determining comprises:
using a Shack-Hartmann sensor to determine the aberration.

17. The method of claim 1 further comprising:
irradiating, subsequent to applying, the adjustable layer to lock in the modified characteristic.

18. The method of claim 17, wherein the irradiating comprises:
applying a lock-in pattern that has a top hat intensity profile.

19. The method of claim 18, wherein the irradiating comprises:
applying a lock-in pattern that has an intensity profile that diminishes as the radius increases from the center.

* * * * *